United States Patent

Slade

Patent Number: 5,982,993
Date of Patent: Nov. 9, 1999

[54] METHOD AND APPARATUS FOR COLOR REPLACEMENT USING AN EXTENDED INK SET

[75] Inventor: Michael L. Slade, Rochester, N.Y.

[73] Assignee: Xerox Corporation, Stamford, Conn.

[21] Appl. No.: 08/963,365

[22] Filed: Nov. 3, 1997

[51] Int. Cl.$^6$ .............................. G06F 15/00; H04N 1/46
[52] U.S. Cl. .......................... 395/109; 382/162; 358/520
[58] Field of Search .................... 358/500, 515, 358/517, 516, 520; 382/162, 167; 395/109

[56] References Cited

U.S. PATENT DOCUMENTS

| | | | |
|---|---|---|---|
| 4,511,989 | 4/1985 | Sakamoto | 364/723 |
| 4,686,538 | 8/1987 | Kouzato | 346/1.1 |
| 5,161,010 | 11/1992 | Birnbaum | 358/79 |
| 5,331,438 | 7/1994 | Harrington | 358/500 |
| 5,631,748 | 5/1997 | Harrington | 358/502 |
| 5,710,824 | 1/1998 | Mongeon | 382/162 |

OTHER PUBLICATIONS

"Principles of Color Reproduction" by J.A.C. YULE;Kodak Research Laboratories, Rochester, New York; pp. 294–327.

Primary Examiner—Jerome Grant, II
Attorney, Agent, or Firm—Tallam I. Nguti

[57] ABSTRACT

A method and apparatus for color replacement using an extended ink set in a color printing system. A color replacement apparatus receives a color signal of a device dependent color space after being generated in response to a colorant signal of a device independent color space. The color replacement apparatus receives the color signal of the device dependent color space, and generates as a function of the received signal, a second color signal including a first hue and a first saturation, and a third color signal including the first hue and a second saturation, different from the first saturation. Multiple color planes for all of the inks of the extended ink set are generated according to a preselected threshold.

16 Claims, 3 Drawing Sheets

METHOD AND APPARATUS FOR COLOR REPLACEMENT USING AN EXTENDED INK SET

FIELD OF THE INVENTION

This invention relates generally to color printing and more particularly to a method and apparatus for color replacement using an extended ink set.

BACKGROUND OF THE INVENTION

Liquid ink printers of the type frequently referred to as continuous stream or as drop-on-demand, such as piezoelectric, acoustic, phase change wax-based or thermal, have at least one printing mechanism, such as a printhead, from which droplets of ink are directed towards a recording sheet. Within the printhead, the ink is contained in a plurality of channels. Power pulses cause the droplets of ink to be expelled as required from orifices or nozzles at the end of the channels.

In a thermal ink-jet printer, the power pulses are usually produced by resistors, each located in a respective one of the channels, which are individually addressable to heat and vaporize ink in the channels. As voltage is applied across a selected resistor, a vapor bubble grows in the associated channel and initially bulges from the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which in turn, draws ink from a supply container of liquid ink. Operation of a thermal ink-jet printer is described in, for example, U.S. Pat. No. 4,849,774.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print color and/or monochrome images received from an image output device such as a personal computer, a scanner, or a workstation. The color images are produced by printing with several colored inks or colorants of different colors at a time. The color of the ink and amount of ink deposited by the printer is determined according to image information received from a document creator such as a scanner or a computer workstation. The document creator provides an input digital signal gray-scale image, which is either defined in monochromatic terms, calorimetric terms, or both. The amount of gray level is typically defined by an input pixel value ranging from 0 to 255 where 0 is equal to white, 255 is equal to black, and values therebetween are shades of gray. For an image defined in colorimetric terms, the input pixel values are typically digital signals of R, G, B (red, green, and blue). Commonly this description may be part of a Page Description Language (PDL) file describing the document. In the case of computer generated images, colors defined by the user at a user interface of a workstation can be defined initially in a color space of tristimulus values. These colors are defined independently of any particular device, and accordingly reference is made to the information as being "device independent".

The printer, on the other hand, often has an output which can be defined as existing in a color space called CMYK (cyan-magenta-yellow-key or black) which is uniquely defined for the printer by its capabilities and colorants as well as the media upon which the printer deposits ink. Printers operate by the addition of overlapping multiple layers of ink or colorant in layers to a page or by the adjacent deposition of colorants. The response of the printer tends to be relatively non-linear. These colors are defined for a particular device, and accordingly reference is made to the information as being "device dependent". Thus, while a printer receives information in a device independent color space, the information must be converted to print in a device dependent color space, which reflects a possible range of colors of the printer, and secondly, printing of that image with a color printer in accordance with the colors defined by the scanner or computer generated image.

The perceived color of the image is determined not only by the relative amounts of each colorant put down on the recording medium, but also by the order in which the colorants are printed and the media type. Consequently, there are a multitude of variables which affects a final printed image. To accurately reproduce an original image, therefore, requires a transformation from a device independent color space to a multitude of device dependent color spaces, each one being determined, at least in part by, the combined effects of colorant, image density, media type, and print speed.

Various color printing systems and methods for printing color images on a recording medium are illustrated and described in the following disclosures which may be relevant to certain aspects of the present invention.

In U.S. Pat. No. 4,686,538 to Kouzato, a tone recording method wherein ink dots having at least two different concentrations per color are provided and the number of dots for each concentration to be printed in a pre-determined area is described. High and low density dots for yellow, magenta and cyan are described.

U.S. Pat. No. 5,161,010 to Birnbaum, describes an apparatus to determine the intensity of signals generated by a raster input scanner. Signals generated from a delay circuit and a gray detector are sent to a logic circuit which determines whether to output a gray signal or a non-gray signal to a raster output scanner.

U.S. Pat. No. 5,331,438 to Harrington, describes a method and apparatus for improving full color images using process black and printer black. An undercover removal and halftoning method which avoids abrupt density shifts and textures is described.

U.S. Pat. No. 5,631,748 to Harrington, describes halftone screens which are generated for each separation in accordance with a goal of avoiding overlapping whenever possible and with a goal of reducing interpixel contrast. Under color removal is selectively used to optimize the dot appearance. Black is increased or reduced in association with color increase or decrease to allow the appropriate space for filling with reduced luminance contrast.

The described invention applies to color systems having more than four colorants.

SUMMARY OF THE INVENTION

In accordance with one aspect of the present invention, there is provided a color printing system for printing an image on a media from a plurality of image signals. The color printing system includes a printing mechanism, to deposit a plurality of colorants on the media for printing the image thereon, and a color replacement apparatus, coupled to the printing mechanism, receiving a first color signal, and generating as a function of the first color signal, a second color signal including a first hue and a first saturation, and a third color signal the first hue and a second saturation, different from the first saturation.

Pursuant to another aspect of the present invention, there is provided a method of printing an image with a color liquid ink printing system, including a color replacement device, as a function of a device independent color signal. The method includes the steps of providing a threshold signal as a function of a desired image characteristic, generating a first color signal, including a first hue and a first saturation, as a function of the selected threshold and the device independent color signal, generating a second color signal, including the first hue and a second saturation, as a function of the selected threshold and the device independent color signal, and printing the image as a function of the generated first color signal and the second color signal.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
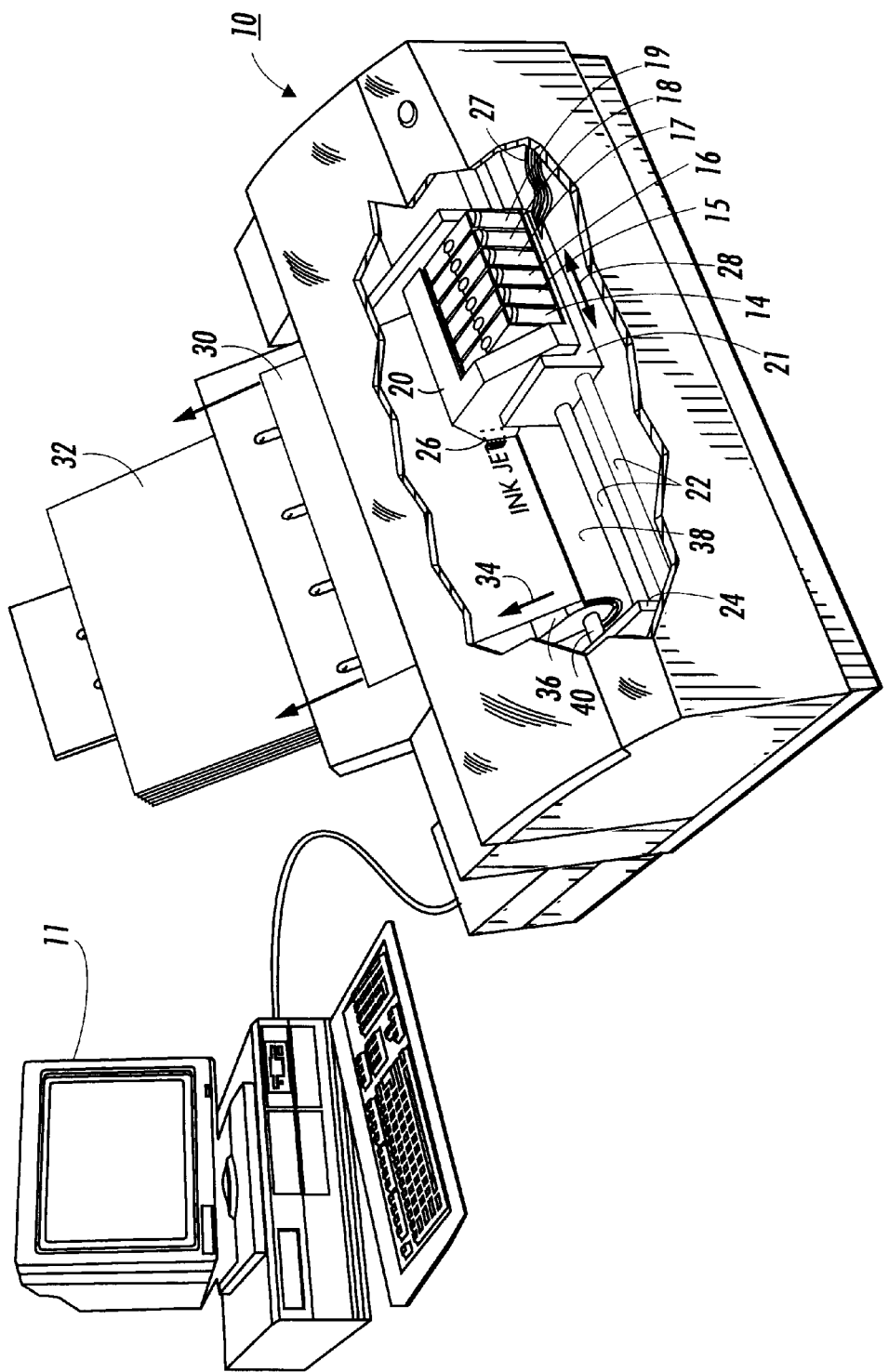
FIG. 1 is a perspective view of a color ink jet printing system incorporating the present invention.

FIG. 1 illustrates a perspective view of a color printing system including a color thermal ink jet printer 10. Printer 10 is exemplary only. The invention can be practiced in other types of thermal ink jet printers, as well as other reproduction devices including liquid ink printers driven by signals from a document raster input scanner or signals received from a computing device, such as a personal computer 11. Printer 10 includes an extended ink set having six ink jet ink containers 14, 15, 16, 17, 18, and 19. An extended ink set includes more than one ink of the same or similar hue but having different saturations. The ink containers include, respectively, regular cyan ink($C_R$), light cyan ink($C_L$), regular magenta ink($M_R$), light magenta ink($M_L$), yellow(Y), and black(B) such that in addition for magenta and cyan, two inks of the same hue but different in saturation are used. The use of inks having the same hue but different in saturation provides for a wider variety of ink from which to select and therefore can result in a printed image which more accurately portrays an original image, such as in the case of photographs.

The ink containers are mounted in a print cartridge 20 on a carriage 21 supported by carriage rails 22. The carriage rails 22 are supported by a frame 24 of the ink jet printer 10. The printhead cartridge, which comprises the ink containers, contain ink for supply to one or more thermal ink jet printheads 26 which selectively expel droplets of ink under control of electrical signals received from a controller (not shown) of the printer 10 through an electrical cable 27. The printhead 26 contains a plurality of ink channels which carry ink from one or more of the ink containers 14, 15, 16, 17, 18, and 19 to respective ink ejecting orifices or nozzles of the printhead 26. While When printing, the carriage 20 reciprocates or scans back and forth along the carriage rails 22 in the direction of an arrow 28. As the printhead 26 reciprocates back and forth across a recording medium 30, fed from an input stack 32 containing, for instance, sheets of paper or transparencies, droplets of ink are expelled from selected ones of the printhead nozzles towards the recording medium 30. The ink ejecting orifices or nozzles are typically arranged in a linear array substantially perpendicular to the scanning direction 28 and consequently images are created line by line in multiple swaths of the printhead. In pagewidth printers a single line of information crosses substantially the entire width or length of the recording medium.

If printing in color, such a linear array can be segmented such that segments of the array deposit different colors of ink to complete a color image. It is also possible that each of the ink containers are connected to or include an individual linear nozzle array such that the printer includes six linear arrays, one for each ink. Combinations of segmented arrays and individual arrays are also possible. During each pass of the carriage 21, the recording medium 30 is held in a stationary position. At the end of each pass, the recording medium is stepped in the direction of an arrow 34. For a more detailed explanation of the printhead and printing thereby refer to U.S. Pat. No. 4,571,599 and U.S. Pat. No. Re. 32,572, the relevant portions of which are incorporated herein by reference.

The single recording sheet 30 is fed from the input stack through the printer along a path defined by a curved platen 36 and a guide member 38. The sheet 30 is driven along the path by a transport roller 40 as is understood by those skilled in the art or, for instance, as illustrated in U.S. Pat. No. 5,534,902, herein incorporated by reference. As the recording medium 30 exits the slot between the platen 36 and guide member 38, the sheet 30 is caused to reverse bow such that the sheet is supported by the platen 36 at a flat portion thereof for printing by the printhead(s) 26.

To print color images received from a document creator, such as the personal computer 11, the image must be converted from an image defined in colorimetric terms, R, G and B electronic signals, which are typically digital in nature, to an output which is typically defined as existing in a color space of CMY and K electronic signals. For the present invention, however, the color space includes light cyan ink and light magenta inks. Consequently, to make such a conversion, the original color space must be transformed to the printer color space such that the resulting printed output reproduces the original image in a desired fashion.

Figure 2:
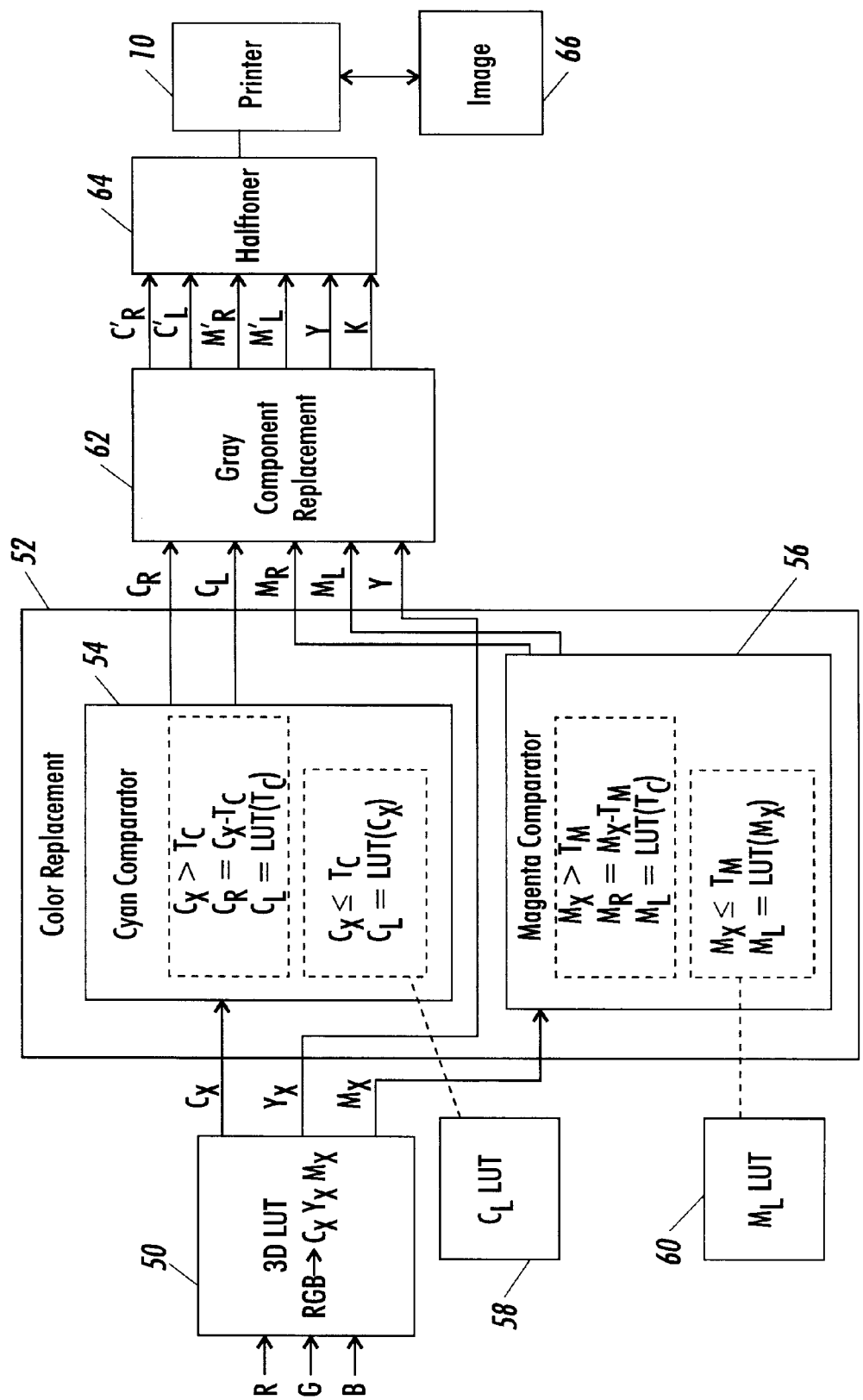
FIG. 2 is a schematic circuit diagram of a control arrangement for a printing system including a print driver having a color replacement circuit of the present invention.

FIG. 2 is a schematic circuit diagram of a control arrangement for a printing system including a print driver having a color replacement circuit of the present invention. As illustrated in FIG. 2, R, G, and B color signals which are generated, for instance by the personal computer 11, are directed to a three dimensional look up table 50 which converts the R, G, B signals to cyan, magenta and yellow colorant signals. The three dimensional look up table 50 is typically stored in a device memory such as a read only memory or other addressable memory devices which meet the speed and requirements for a particular device. The color signals R, G, and B are processed to generate address entries to the look up table 50 which stores a set of coefficients with which the R, G, and B signals are processed to convert them to the C, M, and Y colorants signals. Values which are not mapped may be determined through interpolation.

There are many known methods of providing a transform from device independent data to device dependent data with U.S. Pat. No. 4,275,413 to Sakamoto et al., herein incorporated by reference, describing a linear interpolation transformation method, which can be varied. Once a conversion table is established, a method of interpolation referred to as tri-linear or cubic interpolation may also be used to calculate output values from the limited set of input values.

Once the C, M and Y colorants signals have been determined, a color replacement device 52, operating in accordance with the present invention, generates a larger number of colorant signals in response to the C, M and Y signals. The color replacement device 52 includes a mechanism to convert a single colorant signal having a single hue and a saturation with two colorant signals, each having the same hue but a different saturation. The device 52 includes a cyan comparator 54 and a magenta comparator 56. Once color transform techniques determine the C, M, Y signals then the color replacement device performs a one or more color undercolor removal strategy to replace, for instance, none, some, or all of the regular cyan with a light cyan according to the cyan comparator 54. To accomplish this, the cyan comparator receives the cyan signal from the three-dimensional look-up table 50 and performs a comparison of this signal to a pre-determined threshold $T_C$. The pre-determined threshold $T_C$ is used to determine how much of the original cyan signal $C_X$ is to be replaced with the combination of a determined amount of regular cyan $C_R$ and light cyan $C_L$. This threshold is selected according to a desired output image characteristic and includes where one saturation of single hue is changed to a different saturation of the same hue. To accomplish this under color removal strategy for cyan, the cyan comparator 54 compares the cyan signal $C_X$ to the threshold signal $T_C$. If $C_X$ is greater than $T_C$ then the amount of regular cyan is determined to be equal to $C_X$ minus $T_C$. The amount of light cyan is determined by the threshold level $T_C$ whose value is encompassed in a $C_L$ look up table 58. If, however, $C_X$ is less than or equal to $T_C$, then $C_L$ is equal to the value of $C_X$ as determined by the $C_L$ look up table 58. The threshold values may also be determined by a mathematical algorithm, such as embodied in software or hardware, or other determining methods or apparatus.

The amounts of regular magenta, $M_R$, and light magenta $M_L$, are determined similarly by the magenta comparator 56. In the magenta comparator, if $M_X$ is greater than a pre-determined threshold $T_M$ then regular magenta is equivalent to $M_X$ minus $T_M$ and $M_L$ is equal to $T_C$ as encompassed in the $M_L$ look up table. If, however, $M_X$ is less than equal to $T_M$ then $M_L$ is equivalent to the value of light magenta as found in the light magenta look up table 60 for the value of $M_X$.

The amount of regular colored inks being replaced by light colored inks needs not be the same for each of the inks. For instance, the value of the threshold selected for cyan might provide for 10% of the regular cyan to be replaced by light cyan but the value of the threshold selected for magenta might provide for 15% of the regular magenta to be replaced with light magenta. By using different thresholds for the cyan ink as compared to the magenta ink, it is possible to change the transition points from when full light cyan is switched to regular cyan and full light magenta switches to regular magenta. Smooth blends of the inks are therefore accomplished at different values such that once each of the color planes are superimposed for printing a final image, any correlation between the planes is subsequently reduced.

While the circuit 52 can be embodied as a dedicated hardware circuit using standard logic chips or a single chip using VLSI designs, the circuit is more likely to be implemented in a microprocessor resident in the personal computer 11, the printer 10, or a combination thereof. It is common place to program and execute the described invention for conventional or general purpose microprocessors. This is taught by various prior patents and commercial products. Such programming or software may, of course, vary depending upon a particular function, software type, and microprocessor or other computer system utilized but will be available to or be readily programmable, without undue experimentation, from functional descriptions such as those provided herein or with prior knowledge of functions which are conventional together with general knowledge in the software and computer arts. Such software can include object oriented software development environments such as C++.

The yellow signal $Y_X$ passes through, or outside, the color replacement device 52 without manipulation since yellow is typically not a highly saturated color.

Once the color replacement device 52 has generated the $C_R$, $C_L$, $M_R$, $M_L$ and Y colorants signals, a gray component replacement circuit 62 replaces process black with a single black ink K such that the output of the gray component replacement circuit is $C'_R$, $C'_L$, $M'_R$, $M'_L$, Y' and K.

The gray component replacement circuit 62 determines the density of the signals input thereto in order to replace process black with black ink. Such removal is dependent upon the minimum densities of the ink colorants. Once these densities have been determined, the gray components replacement circuit 62 generates a K signal equivalent to the process black. Known gray component replacement techniques are accomplished by the circuit 62. Black replacement may also be performed prior to individual hue replacement.

After the signal levels corresponding to the extended ink set are determined, such signals are transmitted to a halftoner 64 where the signals are converted from signals having a plurality of levels to signals having a smaller number of signal levels. For instance, the signal levels of the input signals to the halftoner 64 may include from 0 to 255 levels. The halftoner 64, using known halftoning techniques such as halftone masks or error diffusion algorithms, generates signals which are typically bi-level in nature such that the printer 10 prints an image 66 comprised of ink drops. It is also possible, however, that the halftoner might generate signals having multiple levels less than the original number of levels input thereto but greater than two for printing by a printer 10 which might print multiple drops of ink per pixel or location or which might print drops of varying sizes.

Figure 3:
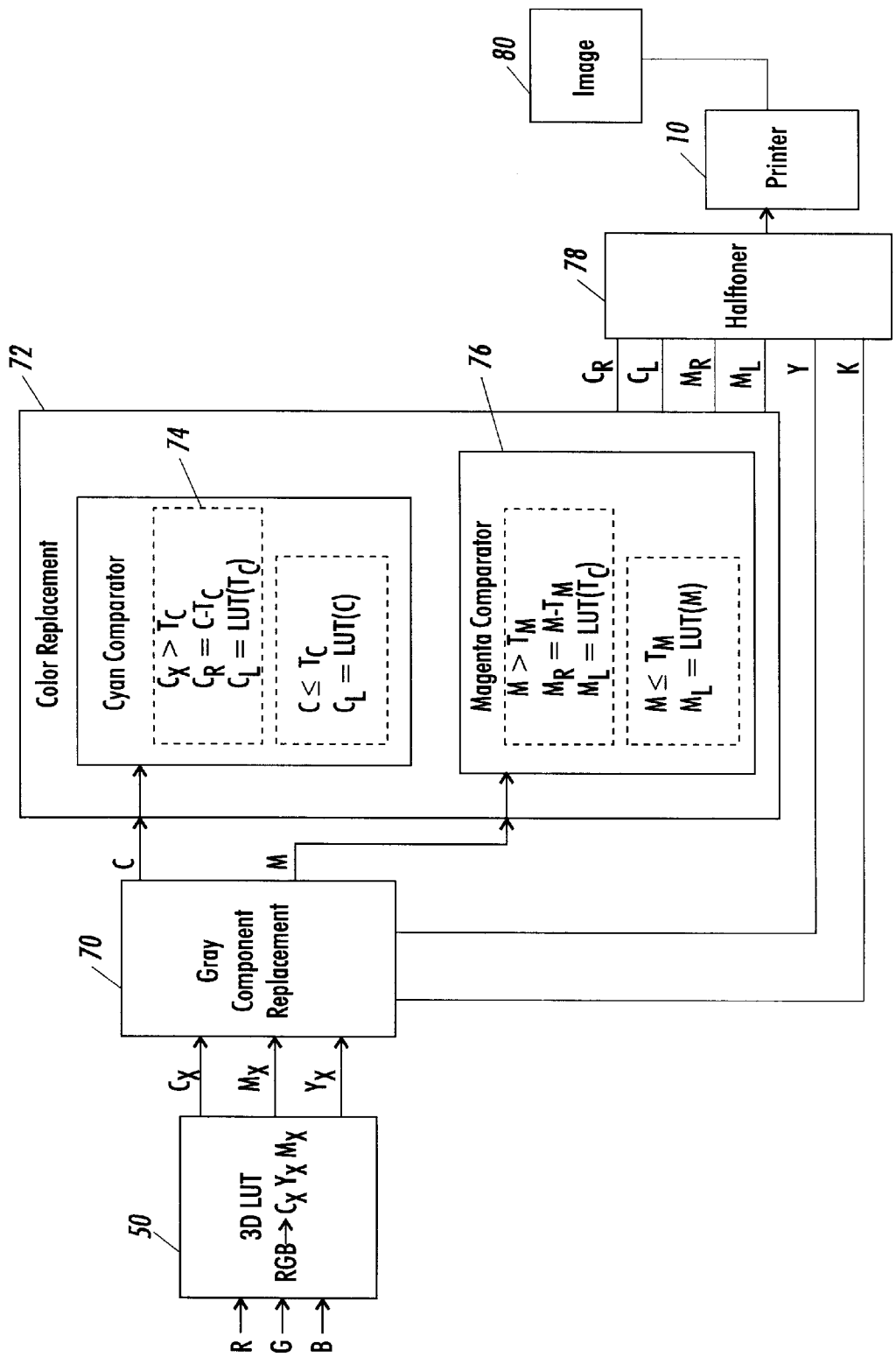
FIG. 3. is a schematic circuit diagram of a control arrangement for a printing system including a second embodiment of a print driver having a color replacement circuit of the present invention.

FIG. 3 is a schematic circuit diagram of a control arrangement for a printing system including a second embodiment of a printer driver having a color replacement circuit of the present invention. As illustrated in FIG. 3, the R, G, and B signals are input to the three dimensional look-up table to generate $C_X$, $M_X$ and $Y_X$ signals. In this embodiment, however, a gray component replacement circuit 70 generates C, M, Y and K signals to replace a pre-determined amount of process black with full color black before the color replacement is performed. Once the C, M, Y and K signals are generated, the cyan signal and magenta signal are input to a color replacement circuit 72 where a cyan comparator 74 and a magenta comparator 76 perform the color replacement as previously described. In this embodiment, however, the selected thresholds $T_C$ and $T_M$ may be different than the previously determined $T_C$ and $T_M$ thresholds of FIG. 2 since the gray component replacement has already been performed. The output of the color replacement circuit 72 includes regular cyan, $C_R$, light cyan, $C_L$, regular magenta, $M_R$ and light magenta, $M_L$. Each of these signals, as well as the yellow and black signals, are transmitted to a halftoner circuit 78 where halftoning is performed as previously described. Once halftoning has been performed, the signals are sent to the printer 10 for printing an image 80.

While this invention has been described in conjunction with a specific embodiment thereof, in an ink jet environment, it is evident that many alternatives, modifications, and variations will be apparent to those skilled in the art. For instance, the present invention is not limited to the embodiments shown, but is applicable to any liquid ink printers including the ability to print images in a single hue colorant having different available saturations. For instance in one practical embodiment of the present invention, the printer includes an extended ink set of C,M,Y, and K but in another practical embodiment the extended ink set might include C, M, Y, K, and orange of two different saturations or even including black of two different saturations to therefore include gray. In addition, the present invention is not limited to ink jet printing but includes xerographic printing, any of standard proof offset, rotogravure, and letterpress. Accordingly, it is intended to embrace all such alternatives, modifications and variations that fall within the spirit and broad scope of the appended claims.

What is claimed is:

1. A color printing system for printing an image on a media from a plurality of image signals, comprising:

a printing mechanism, to deposit a plurality of colorants on the media for printing the image thereon;

a color replacement apparatus, coupled to said printing mechanism, receiving a first color signal, and generating as a function of the first color signal, a second color signal including a first hue and a first saturation, and a third color signal including the first hue and a second saturation different from the first saturation, and a color correction apparatus including a color comparator, for receiving said first color signal, and for generating, as a function of a threshold signal, said second color signal and said third color signal, said color correction apparatus being coupled to said color replacement apparatus, receiving said plurality of image signals, and generating, in response thereto, and said first color signal and said plurality of image signals comprising a red digital signal, a green digital signal, and a blue digital signal.

2. The color printing system of claim 1, wherein said color comparator generates as a function of a comparison between said threshold signal and said first color signal, said second color signal and said third color signal.

3. The color printing system of claim 2, wherein said generated second color signal and said generated third color signal determine the quantity of a first one of said plurality of colorants and a second one of said plurality of colorants to deposit on the media.

4. The color printing system of claim 3, wherein said color comparator comprises a selector, to select a lookup table including signals specifying a signal level of said second color signal.

5. The color printing system of claim 4, wherein said second color signal determines the quantity of a regular cyan colorant.

6. The color printing system of claim 5, wherein said third color signal determines the quantity of a light cyan colorant.

7. A method of printing an image with a printing system, including a color replacement device, as a function of a device independent color signal, comprising the steps of:

providing a threshold signal as a function of a desired image characteristic;

generating a first color signal, including a first hue and a first saturation, as a function of the selected threshold and the device independent color signal;

receiving the first color signal into a color correction apparatus including a color comparator;

generating, as a function of a threshold signal, a second color signal and a third color signal each including the first hue and a second saturation;

receiving the first, second and third color signals into the color correction apparatus, wherein the first, second and third color signals comprise a red digital signal, a green digital signal, and a blue digital signal; and printing the image as a function of the generated first color signal and the second color signal.

8. The method of claim 7, wherein said first mentioned generating step comprises generating the first color signal as a function of a device dependent color signal.

9. The method of claim 8, wherein said second mentioned generating step comprise generating the second color signal as a function of the device dependent color signal.

10. The method of claim 9, further comprising transforming the device independent color signal as a function of a color correction device.

11. The method of claim 10, wherein the color correction device comprises a linear interpolation device.

12. The method of claim 11, comprising printing an image as a function of a plurality of device independent color signals.

13. The method of claim 12, wherein said providing step comprises providing a providing a first threshold signal as a function of a desired image characteristic and one of the plurality of device independent color signals.

14. The method of claim 13, wherein said providing step comprises providing a second threshold signal as a function of a desired image characteristic and another one of the plurality of device independent color signals.

15. The method of claim 14, wherein said providing step comprises providing the first threshold signal as a function of a cyan hue.

16. The method of claim 15, wherein said providing step comprises providing the second threshold signal as a function of a magenta hue.

* * * * *